US005129623A

United States Patent [19]

Lockwood

[11] Patent Number: 5,129,623

[45] Date of Patent: Jul. 14, 1992

[54] LINEAR EGR TRI-BEARING

[75] Inventor: Mark S. Lockwood, Henrietta, N.Y.

[73] Assignee: General Motors Corporation, Detroit, Mich.

[21] Appl. No.: 802,803

[22] Filed: Dec. 6, 1991

[51] Int. Cl.[5] ........................ F16K 31/44; F16K 41/00

[52] U.S. Cl. .................................... 251/214; 251/324; 384/16; 384/138; 277/53; 123/571

[58] Field of Search ............... 251/318, 214, 330, 324, 251/325, 332; 384/16, 138, 144; 123/571, 568; 277/53

[56] References Cited

U.S. PATENT DOCUMENTS

| | | | |
|---|---|---|---|
| 2,448,717 | 9/1948 | Jeffcock | 277/53 X |
| 4,262,690 | 4/1981 | Binegar | 251/214 X |
| 4,725,040 | 2/1988 | Fornuto et al. | 251/214 X |
| 4,773,440 | 9/1988 | Yanagawa et al. | 251/214 X |
| 4,782,811 | 11/1988 | Hewette et al. | 123/571 |
| 4,881,829 | 11/1989 | Koelsch | 277/53 X |
| 5,064,204 | 11/1991 | Jarvinen et al. | 277/53 |

*Primary Examiner*—Martin P. Schwadron
*Assistant Examiner*—Kevin L. Lee
*Attorney, Agent, or Firm*—Karl F. Barr, Jr.

[57] ABSTRACT

An exhaust gas recirculation valve assembly for controlling the recirculation of exhaust gas in an internal combustion engine having a base with an exhaust gas chamber formed therein, a valve assembly having a valve member mounted within the exhaust gas chamber for metering the flow of exhaust gas therethrough, and a valve stem extending out of the chamber through an opening therein, a one piece bearing having upper, intermediate, and lower bearing members for precise positioning of the valve member within the exhaust gas chamber, and a valve stem support assembly for mounting the valve stem relative to an actuator. The intermediate and upper bearing portions operate to deflect exhaust gas, escaping from the exhaust gas chamber and traveling along the valve stem of the valve member, from impinging on the actuator.

2 Claims, 2 Drawing Sheets

LINEAR EGR TRI-BEARING

BACKGROUND OF THE INVENTION

1. Field of the Invention

The present invention relates to an EGR valve having a three-tiered valve stem bearing configuration.

2. Description of the Relevant Art

Typical Exhaust Gas Recirculation (EGR) valves are used to control exhaust gas recirculated to the intake side of an internal combustion engine. The EGR valve generally comprises a valve, positioned by an actuator to meter the exhaust gas which passes through the valve. The actuator retracts the valve from a seat to increase recirculation of exhaust gas, and advances the valve toward the seat to reduce recirculation of gas. The seat is incorporated in a base that mounts the valve on the engine manifold.

Precise alignment of the valve relative to the valve seat is desirable since misalignment of the two components may create a path for gas leakage to the engine causing exhaust gas flow variability, and resulting in wear of the valve and seat. It is desirable to maintain the valve stem in precise, coaxial alignment with the valve seat through the use of a precision valve stem bearing. Such a bearing should, in addition to providing the desired alignment, operate to prevent exhaust gas from escaping from within the EGR valve about the interface with the valve stem and to minimize impingement of any escaping exhaust gas on the valve stem actuator. Contact of the actuator with the moisture laden exhaust gas may result in conditions affecting the optimal performance of the EGR valve.

SUMMARY OF THE INVENTION

In accordance with the present invention, an EGR valve for use in controlling the recirculation of exhaust gas in an internal combustion engine is disclosed which incorporates a three tiered bearing for precise positioning of a valve stem therein, and effective deflection of escaping exhaust gas from impingement on the valve actuator. The EGR valve comprises a base having an exhaust chamber formed therein with inlet and outlet openings, and a valve seat surrounding one of the openings.

A bearing member comprises a lower bearing portion, a bearing extension or web projecting outwardly therefrom, and intermediate and upper bearing portions interconnected by the web in parallel, spaced relationship to the lower portion. Apertures formed in the bearing portions act to guide a valve stem extending outwardly from the exhaust chamber. The intermediate and upper bearing portions, in addition to providing support for the valve stem, act to deflect escaping exhaust gas which may flow upwardly along the pintle shaft carrying moisture towards the valve actuator, which will be described below.

A valve is mounted adjacent the valve seat and has a valve stem which extends out of the base through the opening in the lower bearing portion and the intermediate and upper portions. The bearing assures precise alignment of the valve with the valve seat.

The end of the valve stem remote from the valve has a stepped area for coupling an actuator thereto. The actuator, which operates the valve relative to the valve seat, is rigidly mounted in a spaced relationship to the base. An armature core, having a hollow center, is disposed for reciprocal motion within the actuator. The armature has a laterally extending web portion formed therein having an axially extending aperture through which the remote end of the valve stem extends, and to which it is mounted. The aperture has a diameter larger than that of the valve stem to allow for lateral movement between the stem and the armature web.

A valve stem support assembly comprising a lower support disc and an upper support disc, mounts the remote end of the valve stem to the armature web. The lower disc slides over the end of the stem and rests between a valve stem shoulder, formed between the first stepped portion and the stem, and the lower face of the armature web. The upper disc slides over and is secured to the end of the stem, to rest against the shoulder formed between the second stepped portion and the first, in a face-to-face relationship with the top face of the armature web. As a result, the valve stem is held in engagement with the armature web by the supporting assembly which allows the stem and armature to move laterally with respect to one another but with relative vertical movement restricted due to the action of the upper and lower supporting discs.

A valve position sensor is mounted to the top of the actuator housing and has a follower which moves with the armature to determine valve position. A valve return spring is incorporated into the sensor and acts to return the valve to a closed position when the actuator is not in operation.

The present invention provides an exhaust gas recirculation valve assembly having a bearing capable of precise positioning of the valve relative to the valve seat and of diverting moisture laden exhaust gas from impinging on the valve actuator.

Other objects and features of the invention will become apparent by reference to the following description and to the drawings.

DESCRIPTION OF THE PREFERRED EMBODIMENT

Figure 1:
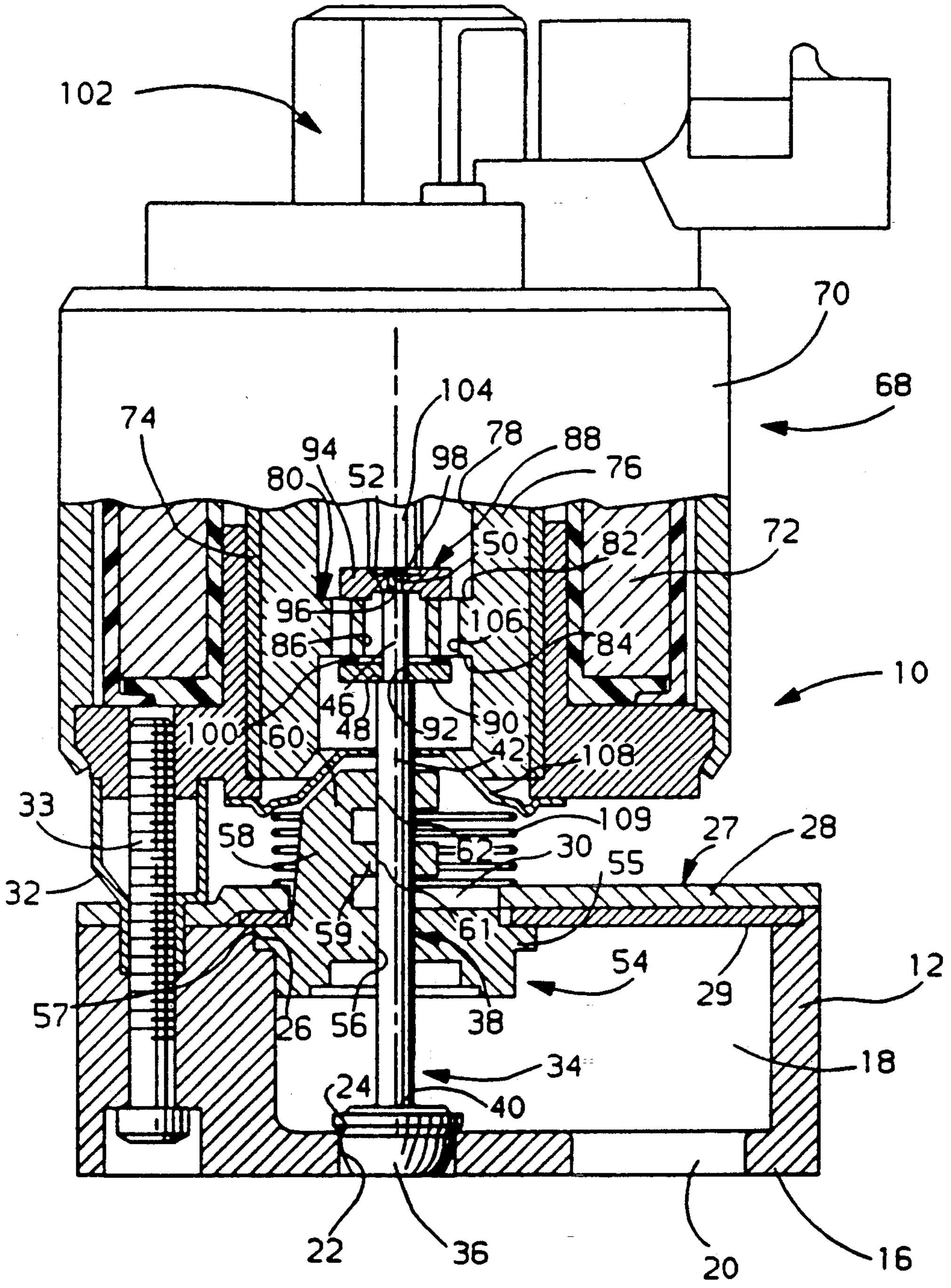
FIG. 1 is a sectional view of an exhaust gas recirculation valve assembly embodying the present invention.
Figure 2:
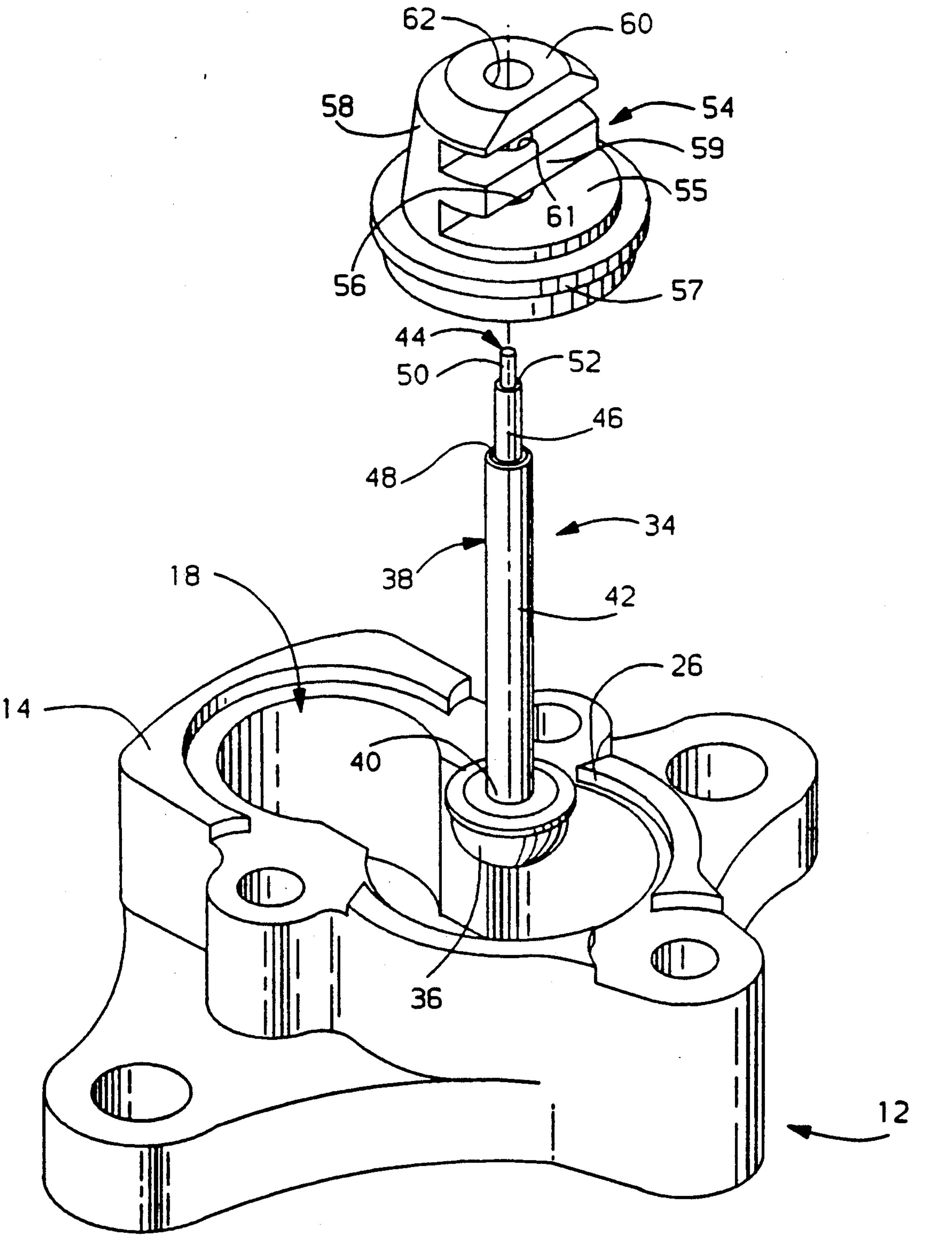
FIG. 2 is an exploded, perspective view of a portion of the exhaust gas recirculation valve assembly of FIG. 1.

In FIG. 1 there is shown an exhaust gas recirculation valve assembly, designated generally as 10, useful for controlling the recirculation of exhaust gas in an internal combustion engine. The assembly 10 comprises a base 12, shown in detail in FIG. 2, having upper and lower surfaces, 14 and 16 respectively. An exhaust chamber 18 is formed in base 12, with an inlet opening 20 and an outlet opening 22 disposed therein. A valve seat 24 surrounds exhaust opening 22, although, in an alternate embodiment the valve seat may be placed about inlet opening 20. A bearing recess 26 formed in base 12, generally in alignment with valve seat 24. In order that valve seat 24 and the bearing recess 26 are accurately aligned with respect to each other, it is preferred that the base 12 be constructed as a one piece, powder metal part with the outlet opening 22, the valve seat 24, and the bearing recess 26, formed in the same powder metal tooling. Such a construction technique eliminates misalignment between the valve seat 24 and the bearing recess 26 which would occur if these features were machined in separate operations.

A cover assembly 27, comprising cover 28 and gasket 29 closes exhaust chamber 18. The cover assembly 27 has an opening 30 extending therethrough, in general alignment with valve seat 24, and one or more support spacers 32 extends outwardly from cover 28. The spacers provide support for an actuator 68, described in further detail below.

A valve assembly 34 is disposed within base 12. The valve assembly 34 comprises a valve member 36 mounted adjacent valve seat 24, and a valve stem 38 having a first end 40 from which valve member 36 extends, a central portion 42, extending outwardly from exhaust chamber 18 through opening 30 in cover assembly 27, and a second end 44 for engagement with actuator 68. Second end 44 is stepped, with a first, reduced diameter portion 46 extending axially from second end 44 to terminate at shoulder 48, and a second reduced diameter portion 50, having a diameter less than that of the first reduced portion 46, which is adjacent to and extends axially from second end 44 a distance less than the first reduced portion to terminate at shoulder 52.

A one-piece bearing 54 aligns valve member 36 with valve seat 24. The bearing 54 comprises a lower bearing portion 55 having an aperture 56 extending therethrough, in coaxial alignment with valve seat 24, which is configured to guide valve stem 38 in a sliding relationship therewith. Disposed about the outer perimeter of lower bearing portion 55 are positioning means such as flange 57 which engage bearing recess 26 to position bearing 54 in precise alignment with valve seat 24.

Projecting outwardly from lower bearing portion 55 through opening 30 in cover assembly 27 is web 58 which supports an intermediate and an upper bearing portion, 59 and 60 respectively, in parallel, spaced relationship to lower bearing portion 55. Intermediate bearing portion 59 and upper bearing portion 60 have apertures, 61 and 62 respectively, extending therethrough in coaxial alignment with valve seat 24 and lower bearing aperture 56 to guide valve stem 38 in a sliding relationship therewith. The spacing of the bearing portions 55, 59 and 60, is such that a minimum amount of axial misalignment of the valve assembly 34, relative to valve seat 24 occurs. In a preferred embodiment, the bearing 54 is constructed in a powder metal process with a pin in the powder pressing machine used to produce bearing apertures 56, 61 and 62. This process allows very precise aperture positioning and a high degree of accuracy with respect to locating the bearing positioning flange 57 because the entire part is formed at the same time and in the same tool.

Leakage of exhaust gas out of exhaust chamber 18 between the valve stem 38 and the lower bearing portion 55 is undesirable due to the release of untreated exhaust gas to the atmosphere and also because of the detrimental effect soot and other contaminants have on the performance and durability of the bearing 54 and actuator 68.

In the event of exhaust gas leakage between valve stem 38 and lower bearing portion 55, it is undesirable for the escaping gas to impinge on the actuator 68. Moisture carried by the exhaust gas may freeze during cold weather operation, interfering with proper actuator and, consequently, EGR valve functioning. Intermediate bearing portion 59 operates as an exhaust gas deflector to redirect the flow of any escaping exhaust gas traveling along valve stem 42.

Actuator 68 is disposed at the second end 44 of valve assembly 34 to operate valve member 36 into and out of engagement with valve seat 24, thereby allowing exhaust gas to flow out of exhaust chamber 18. Actuator 68 comprises a housing 70 fixedly supported in spaced relationship to base 12 by spacers 32 and support screws 33. A coil assembly 72 is mounted within housing 70 with a non-magnetic armature sleeve 74 disposed in a hollow cylindrical central portion thereof. An armature core 76 is mounted within sleeve 74 for reciprocal motion relative to sleeve 74, coil assembly 72, and housing 70. Armature core 76 has an axially extending, hollow central portion 78 in coaxial alignment with valve seat 24, and into which valve stem 38 extends. A central web 80, having upper and lower surfaces 82 and 84 respectively, extends laterally across hollow central portion 78. Web 80 has a thickness, in the axial direction which is less than the axial length of the first reduced portion 46 of valve stem end 44. Additionally, an axially extending opening 86, having a diameter greater than that of the first reduced portion 46 of valve stem end 44, is formed in web 80. As shown in FIG. 1, valve stem end 44 extends through opening 86 in web 80 with space extending, in the lateral direction, on either side of the valve end 44, thereby providing room for relative movement between armature core 76 and valve assembly 34. This lateral movement facilitates the precise, coaxial alignment of the valve stem 38, relative to valve seat 24, by the bearing 54. Binding of the stem 38 may occur without provision for such movement since precise alignment of the valve assembly 34 and the actuator 68 is difficult to maintain due to the many components involved in positioning the armature core 76.

To provide accurate movement in the axial direction, while allowing for lateral movement of the armature core 76 relative to the valve assembly 34, a valve stem support assembly is provided comprising a lower armature support disk 90 having a central opening 92 which corresponds to the diameter of the first reduced portion 46 of valve stem end 44. The support disc is placed over the end 44 of valve stem 38 where it rests against shoulder 48 in a supporting relationship to the lower surface 84 of central web 80. In a similar fashion, an upper armature support disc 94 has a central opening 96 which corresponds to the diameter of the second reduced portion 50 of valve stem end 44. The upper armature support disc 94 rests against shoulder 52 of valve stem end 44 in a face-to-face relationship with the upper surface 82 of central web portion 80. A recess 98 formed in the upper surface of upper support disc 94 allows the end of second reduced portion 50 of valve stem end 44 to be spun down, into the recess to secure valve assembly 34 to armature core 76. In order to minimize any vertical movement of the armature core 76 relative to valve assembly 34, armature biasing means such as spring washer 100 may be disposed between lower support disc 90 and the lower surface 84 of web 80.

The components of the valve stem support assembly 88 are sized in such a way that lateral movement is allowed between the assembly and the inner wall of hollow portion 78 of armature core 76. As a result, during operation, armature core 76 is capable of lateral movement relative to valve stem end 44 due to the space provided within opening 86, as described above.

In order to minimize any axial movement of the armature core 76 relative to valve assembly 34 which may be caused by tolerance variations between the valve stem 38, the armature core 76, and the valve stem support assembly 88, armature biasing means such as spring washer 100 may be disposed between one of the armature support discs 90, 94 and the armature web 80. The spring washer 100 is preferably disposed between lower support disc 90 and armature web lower surface 82 so that armature 76 moves against a solid disc 94 when opening valve 36 thereby maximizing response time and durability.

Vent passages 106 extend axially through web portion 80. The passages prevent a pressure or vacuum condition from occurring on either side of the armature core 76 during reciprocal movement, which would affect response time of the EGR valve.

To prevent ingress of dirt and other contaminants which may affect the operation of actuator 68, armature core seal 108 closes the central opening in coil assembly 72 in which armature core 76 is disposed. Armature core seal 108 has an opening formed therein through which valve assembly 34 passes. Additionally, core seal 108 is held in position by compression spring 109 which extends between the seal and the cover assembly 27, as shown in FIG. 1.

A valve position sensor 102 is mounted to the top of housing 70 and has a follower 104 which is axially aligned with, and extends into the hollow portion 78 of armature core 76 to engage the upper support disc 94. Follower 104 is biased against the armature core 76 by a return spring (not shown) which acts to move the armature and valve assembly axially to seat valve member 36 within valve seat 24 when the actuator is not in operation.

As described above, the exhaust gas recirculation valve assembly of the present invention provides a bearing member which allows precise alignment of the valve with the valve seat thereby minimizing leakage past the valve member and assuring accurate metering of exhaust gas recirculation.

The bearing member is configured to minimize impingement of any escaping exhaust gas on the valve actuator by disrupting gas flow along the surface of valve stem 38, thereby directing the gas away from actuator 68.

While one embodiment of the invention has been described in detail above in relation to an exhaust gas recirculation valve assembly, it would be apparent to those skilled in the art that the disclosed embodiment may be modified. Therefore the foregoing description is to be considered exemplary, rather than limiting, and the true scope of the invention is that described in the following claims.

The embodiments of the invention in which an exclusive property or privilege is claimed are defined as follows:

1. An exhaust gas recirculation valve assembly comprising a base having an exhaust gas chamber through which exhaust gas passes, a pintle valve having a valve member disposed within said exhaust gas chamber operable relative to a valve seat disposed therein to regulate the flow of exhaust gas through said base and a valve stem attached to said valve member and extending outwardly of said chamber through an opening therein, an actuator maintained in a fixed relationship to said base and coupled to said valve stem to operate said pintle valve reciprocably relative to said valve seat, a one-piece bearing member having lower, intermediate, and upper bearing portions supported in parallel, spaced relationship with one another by a web extending between said portions, said spaced bearing portions having coaxially aligned apertures extending therethrough to guide said pintle valve in a sliding relationship therewith, said lower bearing portion operable to close said opening in said base and configured to cooperate with said base so as to align said bearing apertures and said pintle valve with said valve seat to minimize misalignment of said pintle valve relative to said seat, said intermediate and upper bearing portions operable to deflect exhaust gas, escaping from said chamber at the interface of said pintle valve and said lower bearing portion aperture and traveling along said valve stem, from impinging on said valve actuator.

2. An exhaust gas recirculation valve assembly comprising a base having an exhaust gas chamber through which exhaust gas passes, a pintle valve having a valve member disposed within said exhaust gas chamber operable relative to a valve seat in said chamber to regulate the flow of exhaust gas through said base, a valve stem attached to said valve member and extending outwardly of said chamber through an opening therein, an actuator maintained in a fixed relationship to said base and coupled to said valve stem to operate said pintle valve reciprocably relative to said valve seat and, a one-piece bearing member having lower and upper bearing portions supported in parallel, spaced relationship with one another by a web extending between said portions, said spaced bearing portions having coaxially aligned apertures extending therethrough to guide said pintle valve in a sliding relationship therewith, said lower bearing portion operable to close said opening in said base and configured to cooperate with said base so as to align said apertures and said supported pintle valve with said valve seat to minimize misalignment of said pintle valve relative to said seat, and an intermediate bearing portion disposed between said upper and lower bearing portions supported in parallel spaced relationship with said upper and lower bearing portions by said web and having an aperture therein in coaxial alignment with said apertures in said upper and lower bearing portions for slidingly receiving said valve stem and operable to deflect exhaust gas traveling along said valve stem from impinging on said valve actuator.

* * * * *